United States Patent [19]

Jones

[11] Patent Number: 4,547,884
[45] Date of Patent: Oct. 15, 1985

[54] SONIC FLOW PLATE

[75] Inventor: Nelson E. Jones, Huntington Beach, Calif.

[73] Assignee: The United States of America as represented by the Secretary of the Air Force, Washington, D.C.

[21] Appl. No.: 366,743

[22] Filed: Apr. 8, 1982

[51] Int. Cl.⁴ .............................................. H01S 3/22
[52] U.S. Cl. ...................................... 372/58; 372/701
[58] Field of Search ...................... 372/58, 70, 68, 69, 372/90, 61; 323/701

[56] References Cited

U.S. PATENT DOCUMENTS

| | | | |
|---|---|---|---|
| 3,946,332 | 3/1976 | Samis | 372/58 |
| 3,988,700 | 10/1976 | Born | 331/94.5 P |
| 4,021,753 | 5/1977 | Braunschweig et al. | 331/94.5 D |
| 4,230,996 | 10/1980 | Cook, Jr. | 331/94.5 D |
| 4,247,833 | 1/1981 | Morr et al. | 331/94.5 G |
| 4,457,000 | 6/1984 | Rao | 372/58 |

Primary Examiner—William L. Sikes
Assistant Examiner—Léon Scott, Jr.
Attorney, Agent, or Firm—Donald J. Singer; William G. Auton

[57] ABSTRACT

A sonic flow plate assembly for controlling the mass flow rate of gases by use of the sonic choking phenomenon. Identical gas flow control plate portions, each containing a plurality of nozzles formed by the smooth internal surface of vertical passageways in the plates, are connected end-to-end to form a unified gas flow control plate. Each of the nozzle passageways is in the shape of a hollow inverted truncated cone with bases in communication with hollow cylinders. Each plate portion, including the passageways therein, are molded from a fiberglass composite. The connected plate portions are secured in place by transversely positioned tension rods.

10 Claims, 8 Drawing Figures

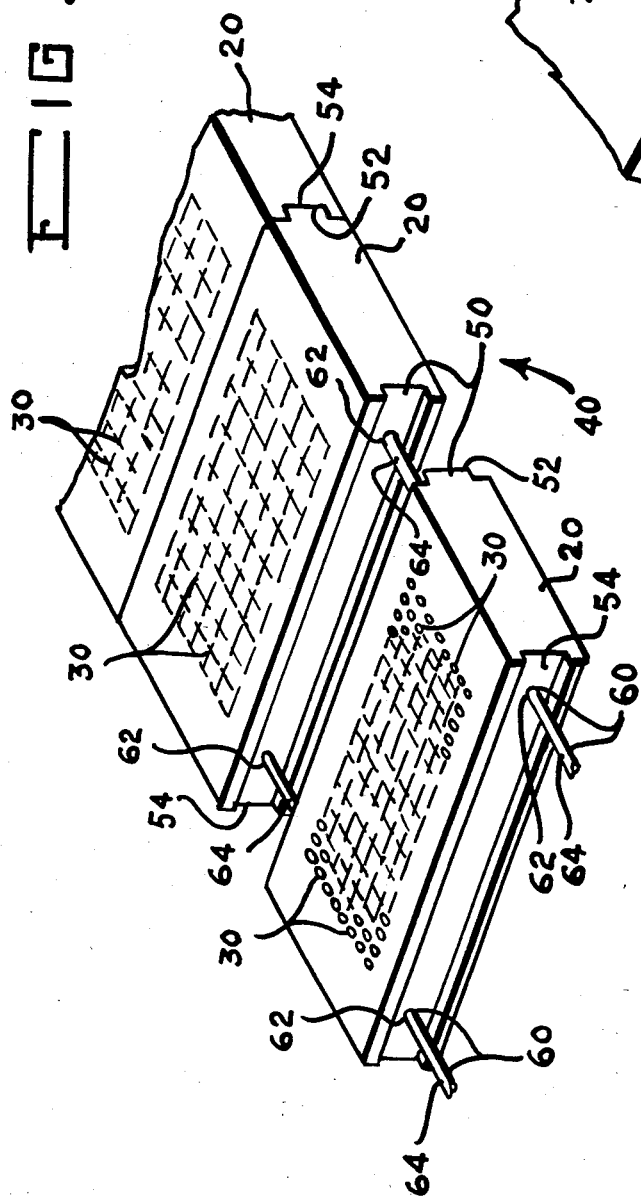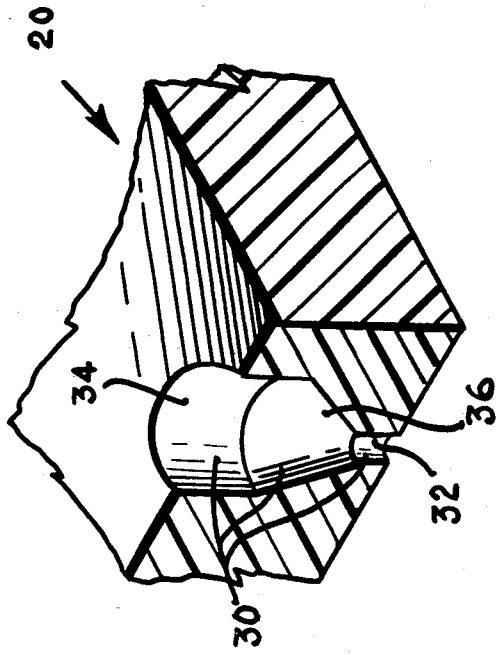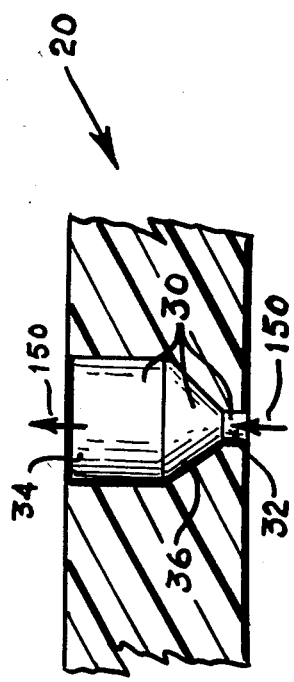

SONIC FLOW PLATE

STATEMENT OF GOVERNMENT INTEREST

The invention described herein may be manufactured and used by or for the Government for governmental purposes without the payment of any royalty thereon.

BACKGROUND OF THE INVENTION

This invention relates to nozzles for controlling gas flow and, more particularly, for controlling said gas flow in a laser.

Mass flow rates of gases generally, and in a laser in particular, can be controlled by use of the phenomenon known to those of ordinary skill in the art as "sonic choking". To make use of this phenomenon in a gas flow laser, a single two-layered gas flow control plate is employed. Numerous small holes are drilled through the plate, with each drilled hole being used as a two-piece gas flow control nozzle. For use in a high energy gas laser, a great many of these very small drilled holes are required in the gas flow control plate to ensure homogineity of the gas in order to produce an acceptable beam path. For example, one such flow plate with dimensions of 108.5×9.25×0.782 inches which is used in a particular high energy gas laser contains 123,173 of the very small holes (i.e., nozzles), with each having a throat measuring 0.0225 of an inch in diameter. In addition, it is to be noted and remembered that for laser applications, high voltages are encountered which require the flow plate to be constructed of a dielectric material, such as fiberglass.

The cost of drilling the aforesaid numerous holes in the fiberglass flow plate is very high. In addition, the rapid erosion of the fiberglass holes requires the premature replacement of the entire flow plate, with accompanying lost time and added cost for replacement. Further, the internal roughness of the holes because of the frayed ends of the fiber glass, which cannot be either controlled or predicted, prevents adequate analytical analysis of the gas flow.

SUMMARY OF THE INVENTION

The instant invention eliminates the aforementioned disadvantages of the prior art and, thereby, constitutes a significant advance in the state-of-the-art. The instant invention overcomes these disadvantages by using a plurality of connectable flow plate portions which when connected and integrated form the usual size single flow plate; by molding the holes rather than drilling them; and by uniquely contouring the internal surface of the holes.

Accordingly, it is an object of the instant invention to provide a plurality of portions which are connectable by a novel means to form the prior art single gas flow control plate.

It is another object of this invention to provide gas flow control plate holes which do not erode rapidly.

It is still another object of the instant invention to provide gas flow control plate holes which have a smooth internal surface.

It is a further object of this invention to provide gas flow control plate holes which do not prevent adequate analytical analysis of the gas flow therethrough.

It is yet another object of the instant invention to permit gas flow control plate holes which are uniquely structured as nozzles.

It is a still further object of this invention to provide a gas flow control plate, useable for use with a laser, which is economical to produce, is long-lived in its intended environment, and lends itself to adequate anayltical analysis of the gas flow therethrough.

These objects of the instant invention, as well as other objects related thereto (e.g., simplicity of structure, and reliability in use) will become readily apparent after a consideration of the description of the instant invention, together with reference to the contents of the figures of the drawing.

BRIEF DESCRIPTION OF THE DRAWINGS

FIG. 3 is a sletch of the preferred embodiment of the present invention; and

FIGS. 4A and 4B are cross-sectional views of a molded hole in the present invention.

DESCRIPTION OF THE PREFERRED EMBODIMENT

Figure 1:
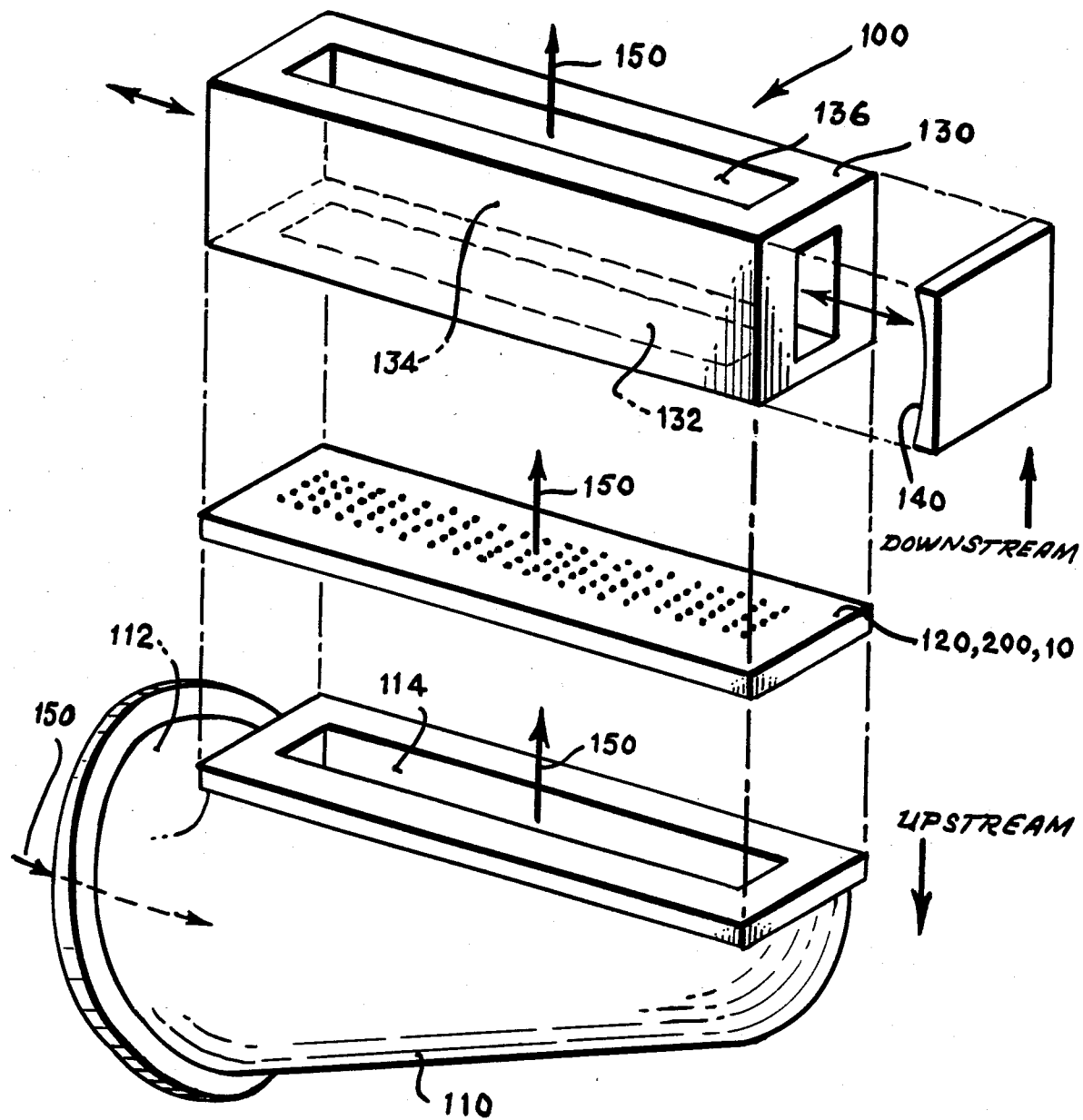
FIG. 1 is a typical laser cavity assembly.

With reference to FIG. 1, there is shown in an exploded view, a typical high energy gas laser cavity assembly 100, and representative donstituent components, with gas 150 flowing therethrough. In an upstream-to-downstream direction, these components include, but are not limited to: the plenum chamber member 110 with gas flow inlet 112 and gas flow outlet 114; a gas flow control plate 120 (also referred to in the art as a "sonic flow plate" because the plate 120 is used to perform the aforesaid "sonic choking") having numerous holes (i.e., nozzles) therethrough; and a laser housing 130 having a gas flow inlet 132, a laser cavity 134, and a gas flow outlet 136. Also shown, to better orient the reader, are the laser mirror 140, directional arrows, and legends, such as "Upstream", "Downstream" and "To Target".

Figure 2A:
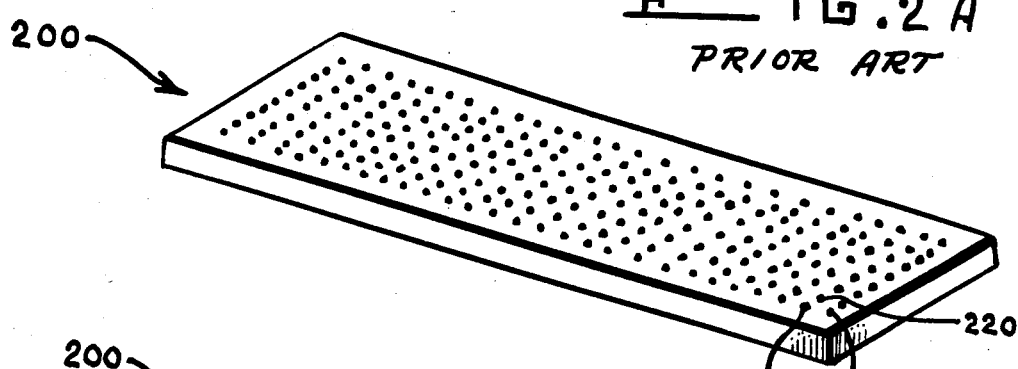
FIGS. 2a-2d are different views of prior art gas flow control plates.
Figure 2B:
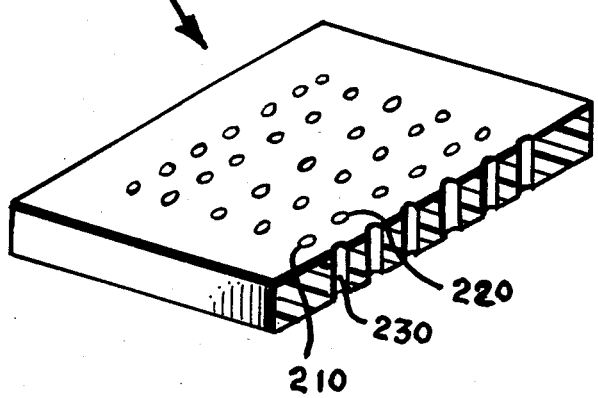
Figure 2C:
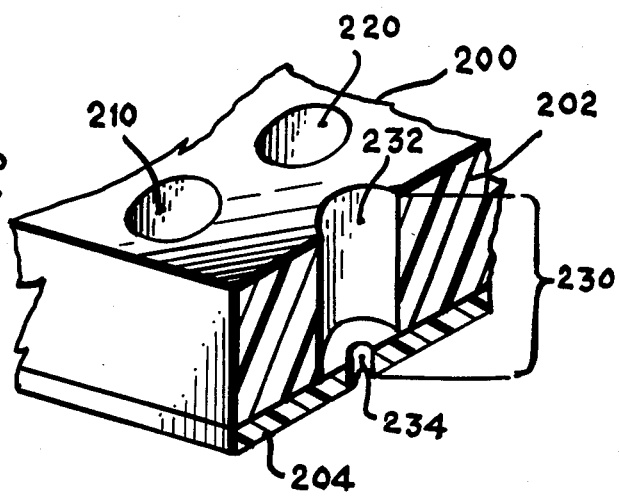

Now, with reference to FIGS. 2A, 2B, 2C and 2D, therein are shown the prior art gas flow control plate 200, FIG. 2A, and fragments of the plate 200 with representative prior art holes, such as 210, 220 and 230, FIGS. 2A, 2B and 2C, drilled therein.

It is here to be noted that prior art gas flow control plate 200, FIG. 2A, is similar to gas flow control plate 120, FIG. 1, and is for the same use, i.e., as a constituent component of a high energy gas laser cavity assembly, such as 100, FIG. 1.

Figure 2D:
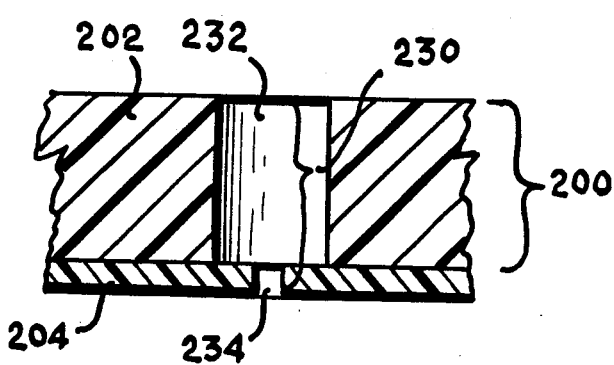

It is also to be noted that the typical prior art gas flow plate, such as 200, FIG. 2A, actually is a two-layered plate, as can best be seen in FIGS. 2C and 2D, which consists of a fiberglass upper layer, such as 202, FIGS. 2C and 2D (that is much in appearance and structure similar to an air filter for a forced hot air furnace) and a lower layer or backing, such as 204, FIGS. 2C and 2D.

It is further to be noted that the typical holes, such as 230, FIGS. 2A-2D, inclusive, drilled in the gas flow control plate 200 are two-layered or two-pieced (as best seen in FIGS. 2C and 2D), with the upper or downstream piece or layer 232 being made of fiberglass per se, and with the lower or upstream piece or layer 234 being made of backing material of a dielectric nature. Both portions 232 and 234 of the representative hole 230 are cylindrical in shape and are in communication. The upper (i.e. downstream) cylindrical portion 232 is of a diameter larger than the diameter of the lower (i.e., upstream) portion 234.

The prior art drilled holes, such as 230, FIGS. 2C and 2D, have wall surface irregularities in the upper (i.e.,-downstream) portion 232, and an area of undefined flow in the upper portion 232 immediately adjacent the upper opening of the lower portion 234.

With reference to FIGS. 3, 4A and 4B, therein is shown, in different views and in diverse fragmentations the preferred embodiment 10 of the instant invention. In the most basic and generic structural form, the preferred embodiment 10 comprises, in operative combination: a plurality of adjacent, serially aligned, identical gas flow control plate portions which are in contact, such as the representative plate portions similarly designated 20 in FIG. 3, with each plate portion 20 having a plurality of passageways, all of which are similarly designated 30, therethrough that are configured and structured such that each passageway 30 is shaped as, and is useable as, a gas flow nozzle; means (generally designated 50, FIG. 3) for connecting plate portions 20 to adjacent plate portions 20, with the plurality of plate portions 20 connected thereby, such that a single unified gas flow control plate 40 is formed, with this plate 40 being in outward appearance like 120, FIG. 1, and 200, FIG. 2A; and, means (generally designated 60, FIG. 3) for securing together the connected plate portions 20.

With reference to FIG. 3, it is here to be remembered, as was stated previously herein, that in the interest of maintaining clarity and also to assist in describing the preferred embodiment 10, one of the plate portions 20 is shown as being separated from the other plate portions which are shown in FIG. 3. In actuality, all of the plate portions 20 are in abutting contact, and none is actually separated while in use in the instant invention.

The means 50, FIG. 3, for connecting the adjacent plate portions 20 to each other to form a single unified gas flow control plate 40, FIGS. 3 and 1, preferably includes a protrusion 52 on each plate portion 20, and a complementary indentation 54 on each adjacent plate portion into which the adjacent protrusion 52 is inserted.

The means 60, FIG. 3, for securing together the plurality of adjacent connected plate portions 20 which form the single unified gas control plate 40, FIGS. 3 and 1, preferably includes a plurality of holes, such as are similarly designated 62 in FIG. 3, through each plate portion 20 being in alignment with the plurality of like holes through the adjacent plate portion, thereby forming a plurality of sets of aligned holes 62. As a matter of preference, there are two such holes 62 in each plate portion 20 going from end-to-end of the plate portion 20 and located near the side edges of the plate portion 20, as is shown in FIG. 3. This securing means 60 further includes a plurality of tension rods, such as are similarly designated 64 in FIG. 3, with one tension rod 64 disposed through each set of aligned holes 62. As can be seen in FIG. 3, there are two sets of aligned holes 62, one set along one side edge of the connected plates 20 and another set along the other side edge of the connected plates 20. It is here to be noted that the use of this securing means 60 not only secures the connected plates 20, but also integrates the assembly 10 and additionally reinforces the integrated assembly 10.

Returning to the plate portions 20 and the plurality of gas flow nozzle shaped passageways 30 in each plate portion 20, and with reference to FIGS. 4A and 4B, each passageway 30 has an upstream section shaped as a first hollow cylinder 32, a downstream portion shaped as a second hollow cylinder 34, and a section 36 therebetween shaped as a hollow inverted frustrum of a cone. As can be seen from FIGS. 4A and 4B, the hollow inverted frustrum shaped section 36 of each passageway 30 has a larger downstream opening which functions as a gas flow outlet and a smaller upstream opening which functions as a gas flow inlet. The first hollow cylinder section 32 of each passageway 30 is of the same size as, is aligned with, and is in contact with the smaller upstream opening of the hollow inverted cone frustrum shaped section 36. The second hollow cylinder section 34 of each passageway 30 is of the same size as, is aligned with, and is in contact with the larger downstream opening of the hollow inverted cone frustrum shaped section 36. As a matter of preference, each of the plurality of passageways 30 is identical.

It is to be noted that each identical gas flow control plate portion 20 is made by molding, and that the material used in molding these plate portions may be any suitable moldable dielectric material. However, a fiberglass composite material is preferred.

It is also to be noted that each plate portion 20 is molded in its entirety, i.e., having the plurality of identical gas flow nozzle shaped passageways 30 therethrough, having the plurality of transverse openings 62 therethrough, having the protrusion 52, and having the complementary indentation 54.

Accordingly, the preferred method of manufacturing a gas flow control plate 40 comprises essentially the steps of:

Firstly, forming, by molding from a fiberglass composite material, the plurality of identical plate portions 20 which collectively will constitute the gas flow control plate 40 in its entirety.

Next, aligning the molded plate portions 20 serially and adjacently in a first end-to-second end positional relationship.

Then, connecting the aligned adjacent plate portions 20 by mating the protrusion 52 on each plate portion with the complementary indentation 54 on the adjacent plate portion 20, thereby forming a single unified flow plate 40.

Lastly, positioning a different tension rod 64 into each set of aligned, transversely positioned openings 62, thereby securing the flow plate 40 in its unified form, and integrating and reinforcing the gas flow control plate assembly 10.

The manner of use, and of operation, of the preferred embodiment 10, FIGS. 3, 4A and 1, of the instant invention can be easily ascertained by any person of ordinary skill in the art from the foregoing description, coupled with reference to the contents of the Figures of the drawing.

For others, the following explanation is given. The manner of use of the preferred embodiment 10 of the instant invention is as shown in FIG. 1. More specifically, the preferred embodiment 10 can be used as a constituent component of a high energy gas laser assembly, such as 100, FIG. 1, where it is interposed between, and operably connected to, the gas flow outlet 114 of the plenum chamber member 110 and the gas flow inlet 132 of the housing laser member 130. The preferred embodiment 10 is used in that high energy gas laser assembly 100, and others like it, to control the mass flow rate of the gas involved, such as 150, FIG. 1. The manner of operation of the preferred embodiment 10, while in use in the assembly 100 and in the environment shown in FIG. 1, simply stated is that, because of the unique configuration and structure of the gas flow nozzle shaped holes 30, the area of undefined flow (previously discussed herein) which results from the use of prior art shaped holes (such as 230, FIGS. 2C and 2D) is eliminated; that, because of the smoothness of the molded internal surface of the holes 30 of the instant invention, the disadvantage of the undesired internal surface roughness of the prior art holes 230 is obviated; and that, because of the foregoing and other favorable structural features, optimum gas flow characteristics can be attained with the preferred embodiment 10 and mass flow rate of gases can be controlled by use of the preferred embodiment 10.

It is abundantly clear from all of the foregoing, and from the contents of the Figures of the drawing, that the stated objects of the instant invention, as well as other objects related thereto, have been achieved.

It is to be noted that, although there have been described and shown the fundamental and unique features of the instant invention, as applied to a preferred embodiment 10, nevertheless various other embodiments, variations, adaptations, substitutions, additions, and the like may occur to and can be made by those of ordinary skill in the art.

Additionally, because of my teaching, it may occur to others of ordinary skill in the art that, in appropriate particular circumstances, the number of the basic and fundamental steps of my inventive method can be increased, decreased, or otherwise varied. In this regard, it is to be noted that the same desired results will be obtained, nevertheless.

What is claimed is:

1. A gas flow control plate assembly, through which a stream of gas is passed, said stream of gas flowing from upstream to downstream, said gas flow control plate assembly comprising:
   a. a plurality of adjacent gas flow control plate portions, which are adjacent to each other and fitted together to form a single flow plate by being placed side by side in a flat plane, with each plate portion having a protrusion which fits into a complementary indentation on the plate portion adjacent to it, said complementary indentation having an interior shape approximately equalling the dimensions of said protrusion, said protrusion thereby connecting said adjacent plate portions so that they are fitted together, with each plate portion having parallel upstream and downstream surfaces, said upstream surface being in a position upstream in said stream of gas from said downstream surface, said parallel upstream and downstream surfaces having a plurality of passageways therethrough, said plurality of passageways conducting said stream of gas through said gas flow control plate assembly, such that each passageway is useable as a gas flow nozzle, each plate portion having a plurality of like transverse holes which are in alignment with the plurality of like transverse holes through the adjacent plate portions, whereby a plurality of sets of aligned holes results; and
   b. a plurality of tension rods, with a different one of said tension rods disposed through one of said plurality of sets of aligned holes in said adjacent gas flow control plate portions, said tension rods receiving, integrating and reinforcing said gas flow control plate assembly by holding in place said plate portions so that single unified gas flow control plate is formed.

2. A gas flow control plate assembly, as set forth in claim 1, wherein each said gas flow nozzle shaped passageway of said plurality in each gas flow control plate portion has an upstream section shaped as a first hollow cylinder, a downstream portion shaped as a second hollow cylinder, and a section therebetween shaped as a hollow inverted frustrum of a cone.

3. A gas flow control plate assembly, as set forth in claim 2, wherein each of said plurality of adjacent gas flow control plate portions is identical in dimensions.

4. A gas flow control plate assembly, as set forth in claim 3, wherein each of said plurality of passageways in each of said identically dimensional gas flow control plate portions is identical.

5. A gas flow control plate assembly, as set forth in claim 4, wherein said plurality of adjacent connected identical gas control plate portions are serially aligned and in contact.

6. A gas flow control plate assembly, as set forth in claim 5:
   a. wherein said hollow inverted cone frustrum shaped section of each gas flow nozzle shaped passageway has a larger downstream opening which functions as a gas flow outlet and a smaller upstream opening which functions as a gas flow inlet;
   b. wherein said first hollow cylinder section of each gas flow nozzle shaped passageway is of the same size as, is aligned with, and is in contact with such smaller upstream opening of said hollow inverted cone frustrum shaped section; and
   c. wherein said second hollow cylinder section of each gas flow nozzle shaped passageway is of the same size as, is aligned with, and is in contact with said larger downstream opening of said hollow inverted cone frustrum shaped section.

7. A gas flow control plate assembly, as set forth in claim 1, with each of said identical gas flow plate portions having a plurality of identical gas flow nozzle shaped passageways therethrough, a plurality of transverse openings therethrough, a first side having a protrusion, and a second side having a complementary indentation, said complementary indentation having an interior shape approximately equalling the dimensoins of said protrusion so that any protrusion can be inserted into said complementary indentation, and each of said identical gas flow plate portions is molded from a moldable dielectric material.

8. A gas flow control plate assembly, as set forth in claim 7, wherein said moldable dielectric material is a fiberglass composite material.

9. A gas flow control plate assembly, as set forth in claim 8, wherein this assembly comprises:
   a flow plate used to conduct gas to a high energy gas laser cavity,
   said flow plate receiving a stream of gas from a plenum chamber, and conducting said stream of gas to said high energy gas laser cavity while blocking shockwaves in said stream of gas from said high energy gas laser cavity.

10. The method of manufacturing a gas flow control plate assembly, comprising the steps of:
   a. forming, by molding from a fiberglass composite material, a plurality of identical plate portions of a gas flow control plate, with each of said plate portion having:
      a first side having a protrusion at a first end and a second side having a complementary indentation at a second end, said complementary indentation having an interior shape approximately equalling the dimensions of said protrusion so that said protrusion on an adjacent plate portion can be inserted into said complementary indentation;

a plurality of identical passageways extending through said plate portion from the top to the bottom thereof, with each passageway having a top cylindrical hollow section, a bottom cylindrical hollow section of a diameter less than that of said top cylindrical hollow section, and an inverted truncated cone hollow section therebetween, with this hollow truncated cone section having a larger base thereof in communication with said top cylindrical hollow section, and having a smaller base thereof in communication with said bottom cylindrical hollow section, and a first and a second plurality of openings extending transversely through said plate portion from said first end to said second end thereof;

b. aligning said plate portions serially and adjacently in a first end-to-second end positional relationship;

c. connecting said aligned adjacent plate portions first end-to-second end by mating said protrusion on said first end of each of said plate portion with said complementary indentation of the adjacently aligned plate portion, whereby a single unified gas flow control plate is formed; and d. positioning a different tension rod through said first and said second plurality of openings extending through each plate portion from said first end to said second end thereof, whereby said gas flow control plate is secured by all tension rods which hold each of said adjacent plate portions in a fixed position with respect to each other.

* * * * *